(12) United States Patent
Fantin et al.

(10) Patent No.: US 11,130,298 B2
(45) Date of Patent: Sep. 28, 2021

(54) METHOD FOR REPAIR OF A STIFFENED PANEL OF ISOGRID TYPE AND STIFFENED PANEL OF ISOGRID TYPE THUS REPAIRED

(71) Applicant: Airbus Operations SAS, Toulouse (FR)

(72) Inventors: Nicolas Fantin, Blagnac (FR); Wilfrid Moyon, Toulouse (FR); Phlippe Duret, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/869,064

(22) Filed: May 7, 2020

(65) Prior Publication Data
US 2020/0353705 A1 Nov. 12, 2020

(30) Foreign Application Priority Data
May 10, 2019 (FR) ...................................... 1904871

(51) Int. Cl.
*B32B 43/00* (2006.01)
*B29C 73/14* (2006.01)
*B29C 73/26* (2006.01)

(52) U.S. Cl.
CPC .............. *B29C 73/14* (2013.01); *B29C 73/26* (2013.01); *B29C 2073/264* (2013.01); *B29C 2073/266* (2013.01); *B32B 43/00* (2013.01)

(58) Field of Classification Search
CPC .. B32B 3/12; B32B 43/00; B64C 1/08; B64C 3/22; B29C 73/00; B29C 73/10; B29C 73/14; Y10T 428/24149
See application file for complete search history.

(56) References Cited

U.S. PATENT DOCUMENTS

2012/0196080 A1 8/2012 Messina et al.

FOREIGN PATENT DOCUMENTS

EP 2481667 A1 8/2012

OTHER PUBLICATIONS

French Search Report; priority document.

*Primary Examiner* — Alexander S Thomas
(74) *Attorney, Agent, or Firm* — Greer, Burns & Crain, Ltd.

(57) ABSTRACT

A method for repair of a damaged stiffened panel of isogrid type, wherein the repair method comprises a step of removal of material with the aim of removing at least one damaged rib and also steps of fitting at least one structural reinforcement connecting at least two nodes positioned about the damaged zone and of at least one wall reinforcement connecting the wall of the stiffened panel and the structural reinforcement.

5 Claims, 6 Drawing Sheets

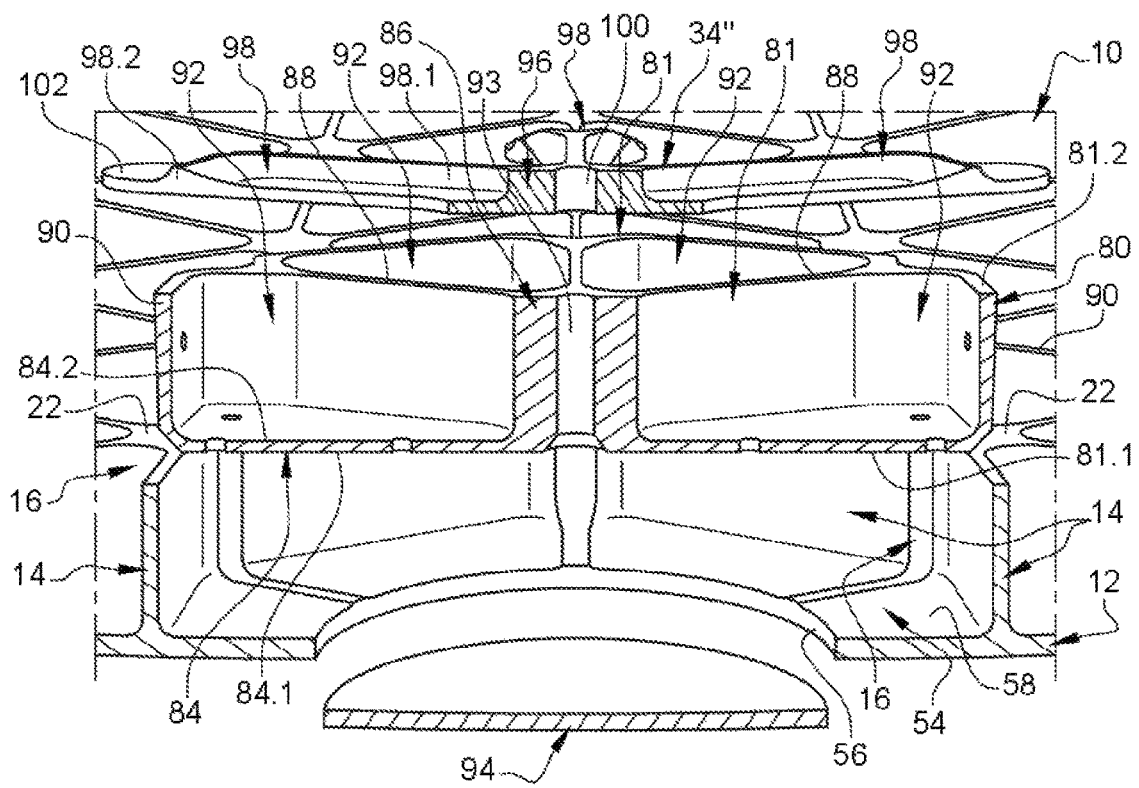
Fig. 16
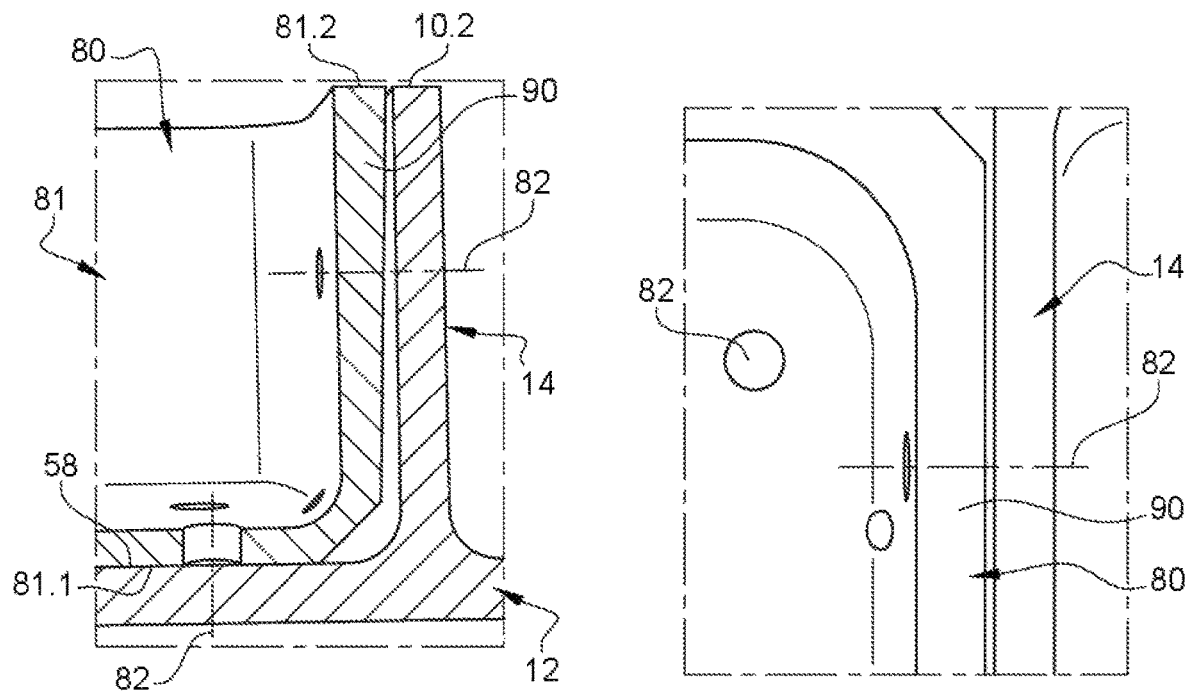
Fig. 17                    Fig. 18

METHOD FOR REPAIR OF A STIFFENED PANEL OF ISOGRID TYPE AND STIFFENED PANEL OF ISOGRID TYPE THUS REPAIRED

CROSS-REFERENCES TO RELATED APPLICATIONS

This application claims the benefit of the French patent application No. 1904871 filed on May 10, 2019, the entire disclosures of which are incorporated herein by way of reference.

FIELD OF THE INVENTION

The present application relates to a method for repair of a stiffened panel of isogrid type and also to a stiffened panel of isogrid type thus repaired.

BACKGROUND OF THE INVENTION

A stiffened panel comprises a wall and also a network of ribs and nodes perpendicular to the wall and arranged relative to one another in such a manner as to form cells. In the case of a stiffened panel of isogrid type, all the cells have a contour in the form of a triangle.

Such a panel may be damaged in the region of the ribs and/or of the wall and/or of the nodes. One solution for repairing such a panel consists in replacing it in its entirety. This solution is relatively costly.

SUMMARY OF THE INVENTION

The present invention aims to remedy all or some of the prior-art drawbacks.

To that end, a subject of the invention is a method for repair of a stiffened panel of isogrid type, comprising a wall, a network of ribs and of nodes arranged in such a manner as to form cells, each having a triangular contour, the stiffened panel having at least one damaged zone. According to the invention, the repair method comprises a step of removal of material with the aim of removing at least one damaged rib from the damaged zone and also steps of fitting at least one structural reinforcement, connecting at least two nodes positioned around the damaged zone, and of at least one wall reinforcement connecting the wall of the stiffened panel and the structural reinforcement.

The structural and wall reinforcements make it possible to compensate for the removal of the damaged parts removed from the stiffened panel by conferring on it a mechanical strength that is substantially equivalent to that which it had initially.

According to another feature, the step of removal of material comprises removing all the damaged ribs from the damaged zone.

According to another feature, the recess forms a large cell corresponding to six adjacent cells of the stiffened panel, and the step of removal of material comprises making an orifice in the wall.

According to another feature, the structural reinforcement is fitted and connected to the nodes surrounding the damaged zone then each wall reinforcement is fitted and connected to the wall and also to the structural reinforcement.

According to another feature, the wall reinforcement is fitted and connected at least to the wall then the structural reinforcement is fitted and connected to the nodes surrounding the damaged zone and also to the wall reinforcement.

A further subject of the invention is a stiffened panel repaired using the repair method according to one of the preceding features, characterized in that the repaired stiffened panel comprises at least one structural reinforcement connected to at least two nodes positioned about the damaged zone and also at least one wall reinforcement connecting the wall of the stiffened panel and the structural reinforcement.

According to another feature, the structural reinforcement comprises at least two heads pressed against terminal faces of the nodes surrounding the damaged zone and connected to the nodes by link elements.

According to another feature, the structural reinforcement has a T transverse section and comprises a body in the form of a band of material, positioned in a plane parallel to the wall bearing against the terminal faces of the first and second nodes arranged on either side of the damaged zone, and also a core integral with the body positioned in a plane perpendicular to the wall between the body and the wall.

According to another feature, the stiffened panel comprises first and second wall reinforcements arranged on either side of the structural reinforcement.

According to another feature, each of the first and second wall reinforcements has an L transverse section and comprises a first wing pressed on and connected to the core of the structural reinforcement by at least a first link element and also a second wing pressed on and connected to the wall by at least a second link element.

According to another feature, the wall reinforcement comprises at least one reinforcement plate pressed on and connected to the wall by link elements.

According to another feature, the wall reinforcement comprises first and second reinforcement plates arranged on either side of the wall, and also a third reinforcement plate intercalated between the first and second reinforcement plates and positioned in the region of an orifice provided in the region of the wall.

According to another feature, the structural reinforcement comprises a plate comprising a first face configured such as to be pressed against the wall reinforcement and a second face opposite the first face, a node projecting and centered relative to the second face of the plate and also a plurality of ribs projecting relative to the second face of the plate and regularly distributed about the node, each rib comprising a first end connected to the node and a second end having a head connected to one of the peripheral nodes located about the damaged zone.

According to another feature, the wall reinforcement comprises a structure of isogrid type comprising a hexagonal wall having a contour approximately equal to that of a recess made in the stiffened panel, a first face configured such as to be pressed against the wall and a second face opposite the first face, a central node positioned on the second face of the wall and a network of radial and peripheral ribs positioned on the second face delimiting six triangular cells about the central node.

According to another feature, the structural reinforcement comprises a central body configured such as to be pressed on and connected to the central node of the wall reinforcement and also six branches distributed regularly about the central body, each branch comprising a first end connected to the central body and a second end having a head connected to one of the peripheral nodes located about the recess.

BRIEF DESCRIPTION OF THE DRAWINGS

Further features and advantages will become apparent from the following description of the invention, which description is given by way of example only with reference to the appended drawings, in which:

FIG. 16 is an expanded section on the line XVI-XVI in FIG. 15, FIG. 17 is a section on the line XVII-XVII in FIG. 15 of the repaired stiffened panel, and FIG. 18 is a top view of a part of the stiffened panel that can be seen in FIG. 15 in the repaired state.

DETAILED DESCRIPTION OF THE PREFERRED EMBODIMENTS

Figure 1:
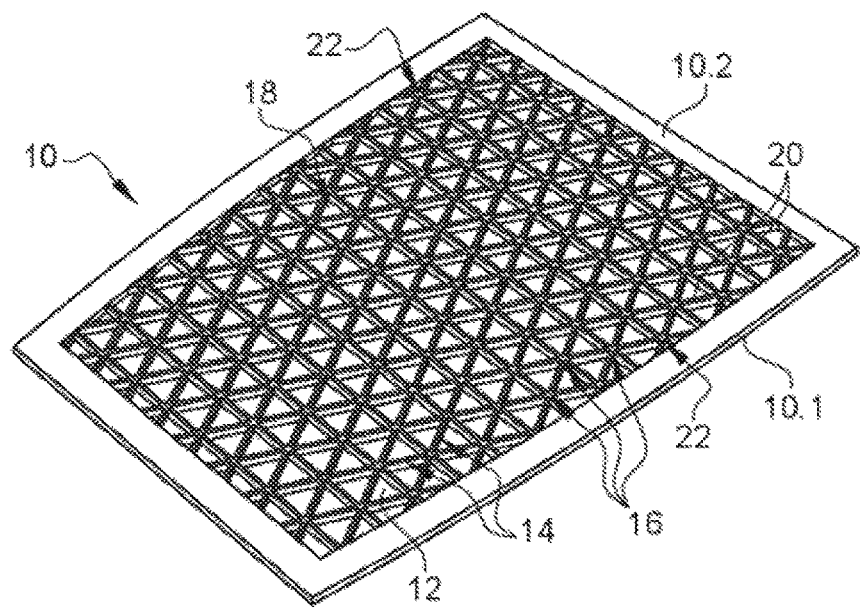
FIG. 1 is a perspective view of a stiffened panel of isogrid type, which illustrates one embodiment.

According to an embodiment that can be seen in FIG. 1, a stiffened panel 10 comprises a wall 12 and also a network of ribs 14 and of nodes 16 perpendicular to the wall 12 and arranged in such a manner as to form cells 18. In the case of a stiffened panel 10 of isogrid type, each cell 18 is delimited by three ribs 14 connecting three nodes 16 and has a contour in the form of a triangle. The stiffened panel 10 comprises a first face 10.1 corresponding to the face of the wall 12 opposite the ribs 14 and a second face 10.2 corresponding to the edges 20 of the ribs 14 opposite the wall 12 and also to the terminal faces 22 of the nodes 16.

Figure 2:
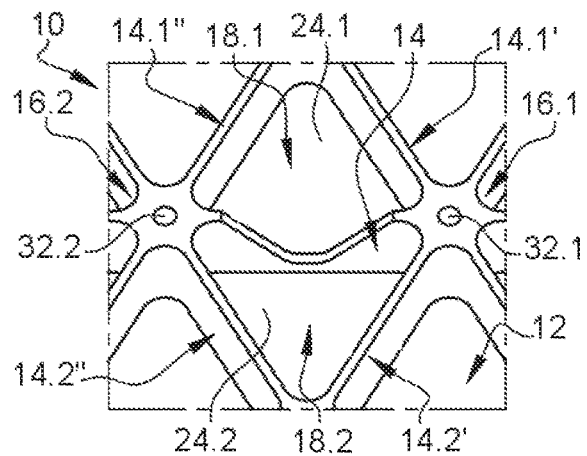
FIG. 2 is a perspective view of a part of the stiffened panel that can be seen in FIG. 1, damaged in the region of a rib.

In FIG. 2, the stiffened panel 10 has a damaged rib 14. This rib 14 separates first and second cells 18.1, 18.2 and connects first and second nodes 16.1, 16.2. The first cell 18.1 comprises a first base 24.1 that corresponds to a part of the wall 12 and also three ribs 14, 14.1', 14.1''. The second cell 18.2 comprises a second base 24.2 that corresponds to a part of the wall 12 and also three ribs 14, 14.2', 14.2''.

Figure 3:
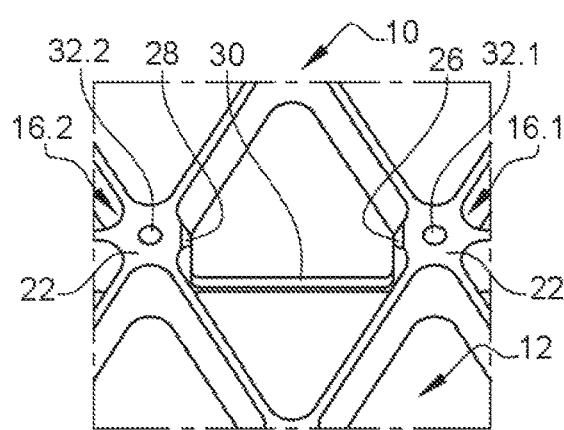
FIG. 3 is a perspective view of the part of the stiffened panel that can be seen in FIG. 2 after a step of removal of the damaged rib, which illustrates a first operating method of the invention.

According to a first operating method, the method for repair of the stiffened panel 10 comprises a first step of removal of material with the aim of removing the damaged rib 14. After this removal of material, the first and second nodes 16.1, 16.2 have first and second edges 26, 28 and the wall 12 has a third edge 30 in place of the damaged rib 14, as illustrated in FIG. 3.

The first and second nodes 16.1, 16.2 have first and second anchoring points 32.1, 32.2 such as, for example, tapped holes having axes perpendicular to the wall 12. According to a first case, the anchoring points 32.1, 32.2 are present in the region of each node 16 prior to the repair method. According to a second case, the anchoring points 32.1, 32.2 are not present prior to the repair method and the latter comprises a step of producing the anchoring points 32.1, 32.2 at least in the region of the first and second nodes 16.1, 16.2.

Figure 4:
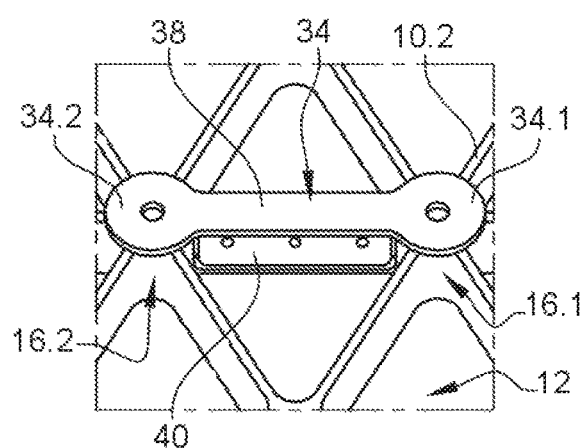
FIG. 4 is a perspective view of the part of the stiffened panel that can be seen in FIG. 3 after a step of fitting a structural reinforcement, which illustrates the first operating method of the invention.

The method for repair of the stiffened panel also comprises a step of placing a structural reinforcement 34 connecting the first and second nodes 16.1, 16.2, as illustrated in FIG. 4. According to one embodiment, the structural reinforcement 34 is positioned against the second face 10.2 of the stiffened panel 10, bearing against the terminal faces 22 of the first and second nodes 16.1, 16.2. The structural reinforcement 34 comprises, at a first end, a first head 34.1 in the form of a washer pressed against the terminal face of the first node 16.1 and connected to the latter by at least a first link element 36.1, such as a screw screwed into the first anchoring point 32.1 of the first node 16.1, and also, at a second end, a second head 34.2 in the form of a washer pressed against the terminal face of the second node 16.2 and connected to the latter by at least a second link element 36.2, such as a screw screwed into the second anchoring point 32.2 of the second node 16.2.

Naturally, the invention is not limited to this embodiment in order to provide the link between the structural reinforcement 34 and the first and second nodes 16.1, 16.2. Thus, the structural reinforcement 34 may be adhesively bonded or welded to the first and second nodes 16.1, 16.2.

Figure 6:
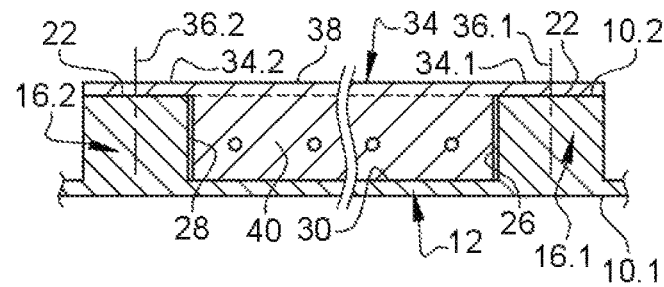
FIG. 6 is a section on the line VI-VI in FIG. 5.

According to one embodiment, the structural reinforcement 34 has a T transverse section (visible in FIG. 7) and comprises a body 38 in the form of a band of material, positioned in a plane parallel to the wall 12 bearing against the terminal faces 22 of the first and second nodes 16.1, 16.2, and also a core 40 integral with the body 38 positioned in a plane perpendicular to the wall 12 between the body 38 and the wall 12. As illustrated in FIG. 6, the core 40 is approximately rectangular and of such a size as to be closely spaced relative to or practically in contact with the first, second and third edges 26, 28 and 30 produced upon removal of the damaged rib 14.

The repair method comprises a step of fitting at least one wall reinforcement 42.1, 42.2 configured such as to connect the structural reinforcement 34 and the wall 12.

Figure 5:
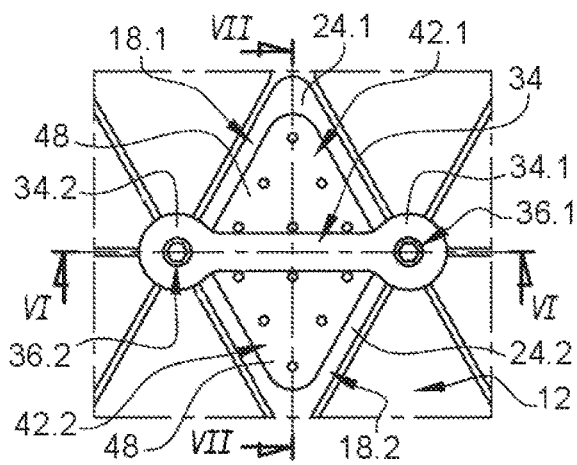
FIG. 5 is a top view of the part of the stiffened panel that can be seen in FIG. 4 after a step of fitting wall reinforcements, which illustrates the first operating method of the invention.
Figure 7:
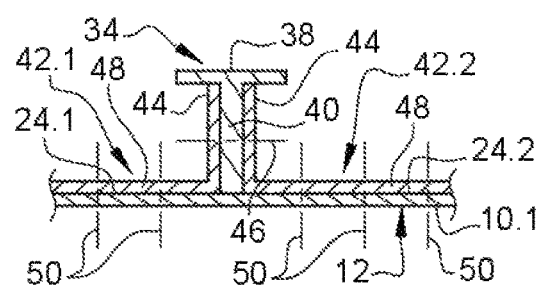
FIG. 7 is a section on the line VII-VII in FIG. 5.

According to one embodiment that can be seen in FIGS. 5 and 7, the stiffened panel 10 comprises a first wall reinforcement 42.1 positioned in the first cell 18.1 connecting the first base 24.1 and the core 40 of the structural reinforcement 34 and also a second wall reinforcement 42.2 positioned in the second cell 18.2 connecting the second base 24.2 and the core 40 of the structural reinforcement 34.

Thus, the first and second wall reinforcements 42.1, 42.2 are arranged on either side of the structural reinforcement 34.

Each of the first and second wall reinforcements 42.1, 42.2 has an L transverse section and comprises a first wing 44, pressed on and connected to the core 40 by at least a link element 46, and also a second wing 48 pressed on and connected to the first or second base 24.1, 24.2 by at least a link element 50. According to one configuration, the second wing 48 of each wall reinforcement 42.1, 42.2 is configured such as to cover practically all the first or second base 24.1, 24.2, as illustrated in FIG. 5.

Naturally, the invention is not limited to this configuration for the structural reinforcement 30 and the wall reinforcements 42.1, 42.2. Thus, the structural reinforcement 34 might not comprise a core 40 and the wall reinforcements 42.1, 42.2 might be connected directly to the body 38 of the structural reinforcement 30. Furthermore, the wall reinforcements may be connected to the wall 12 and/or to the structural reinforcement 34 by adhesive bonding, by welding or the like.

Figure 8:
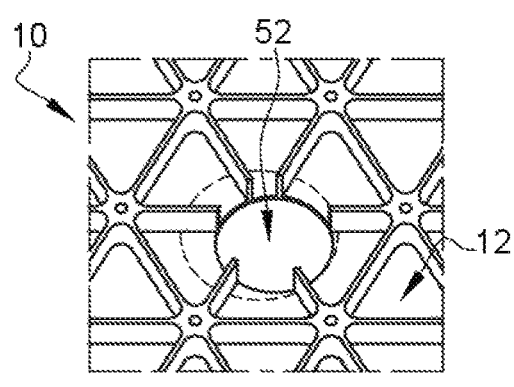
FIG. 8 is a perspective view of a part of the stiffened panel that can be seen in FIG. 1, damaged in the region of the wall.

In FIG. 8, the stiffened panel 10 comprises a damage zone 52 in the region of the wall 12 that affects a node.

Figure 9:
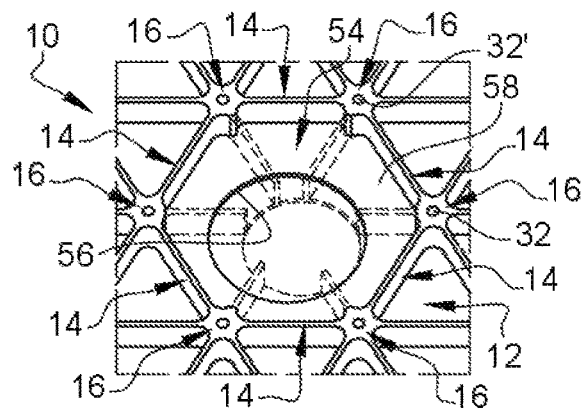
FIG. 9 is a perspective view of the part of the stiffened panel that can be seen in FIG. 8 after a step of removal of material, which illustrates a second operating method of the invention.

According to a second operating method, the method for repair of the stiffened panel 10 comprises a step of removal of material comprising removing a part of the wall 12 and the ribs connected to the affected node. After this step of removal of material, the stiffened panel 10 comprises a large cell 54, corresponding to the six cells adjacent to the affected node that were initially separated by the removed ribs, and also an orifice 56 in the region of the wall 12. In a particular exemplary embodiment illustrated in FIG. 9, the orifice 56 is centered in the large cell 54. This large cell 54 comprises a base 58 corresponding to a part of the wall 12 and, at the periphery, six peripheral nodes 16 connected by six ribs 14.

As for the first operating method, if the peripheral nodes 16 do not comprise anchoring points 32', these latter are produced during the repair method.

The repair method comprises a step of fitting at least one wall reinforcement 60 connected to the wall 12 by link elements 62.

Figure 10:
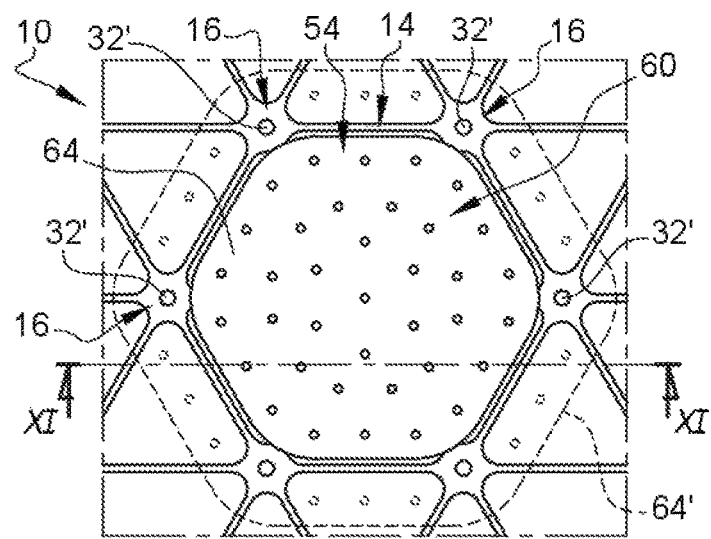
FIG. 10 is a top view of the part of the panel that can be seen in FIG. 9, after a step of fitting wall reinforcements, which illustrates the second operating method of the invention.

According to one embodiment, the wall reinforcement 60 comprises a reinforcement plate 64 pressed against the base 58 and connected thereto by the link elements 62, such as rivets, for example. According to one configuration, the reinforcement plate 64 is configured such as to cover practically all the base 58 of the large cell 54, as illustrated in FIG. 10.

Figure 11:
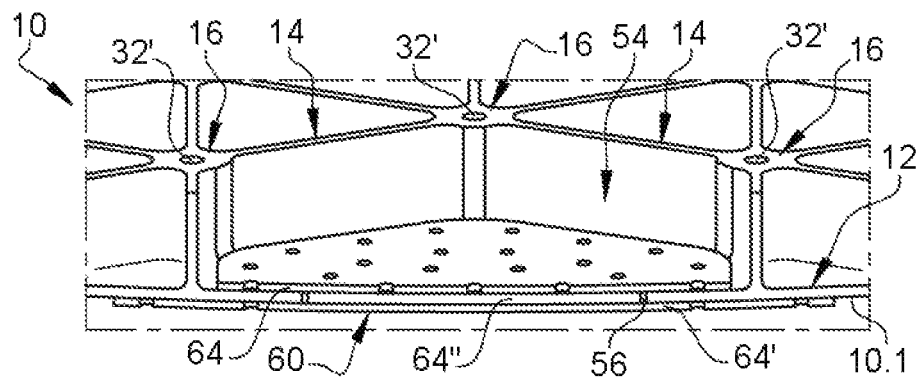
FIG. 11 is a section on the line XI-XI in FIG. 10.
Figure 12:
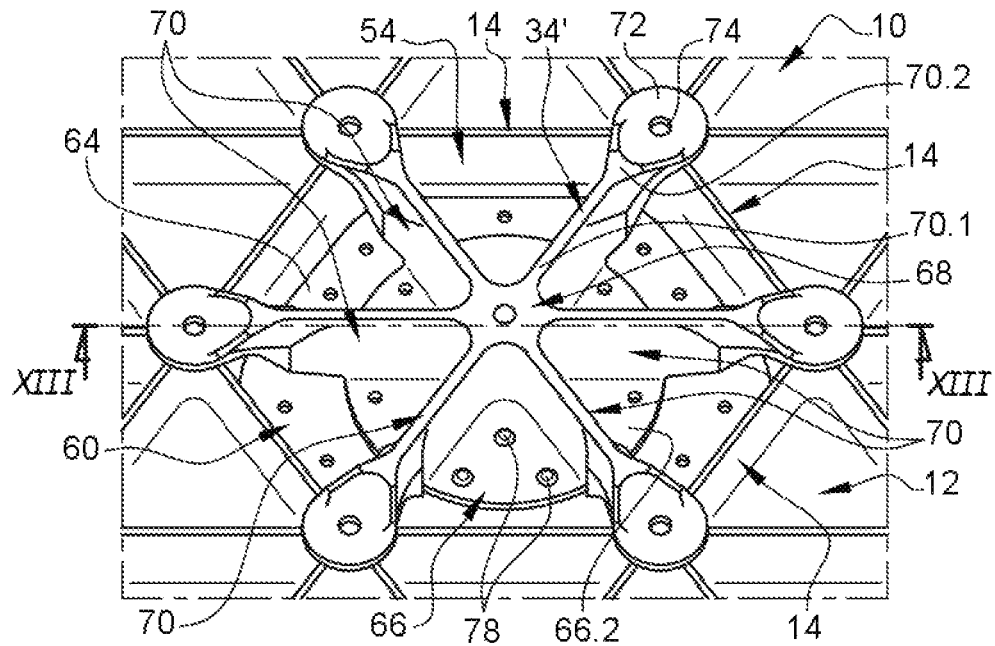
FIG. 12 is a perspective view of the part of the panel that can be seen in FIG. 10 after a step of fitting a structural reinforcement, which illustrates the second operating method of the invention.
Figure 13:
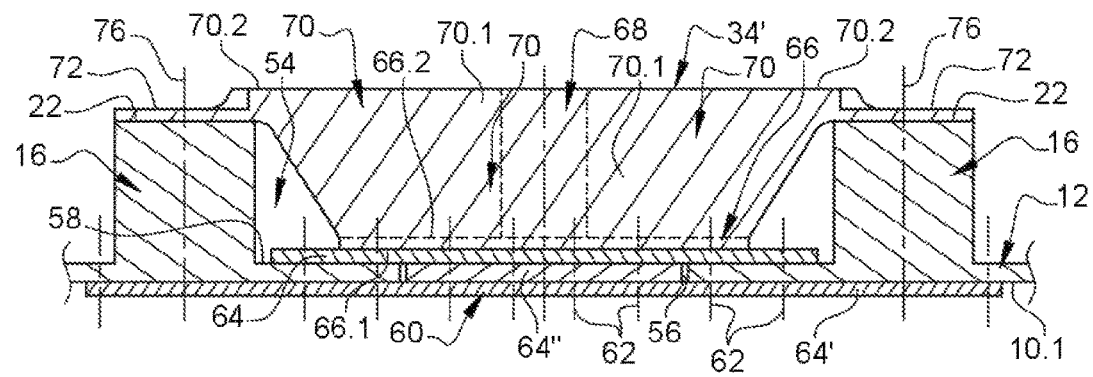
FIG. 13 is a section on the line XIII-XIII in FIG. 12.
Figure 14:
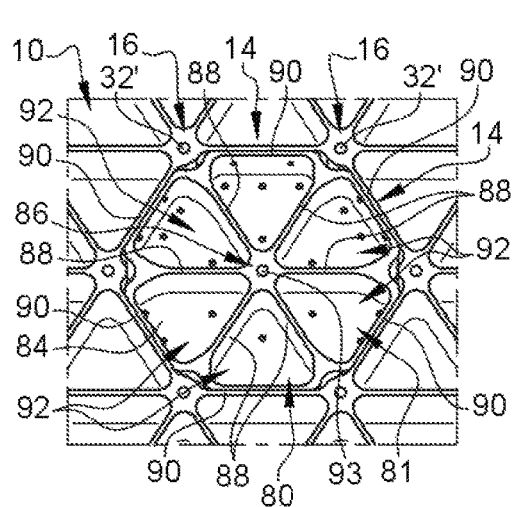
FIG. 14 is a perspective view of the part of the panel that can be seen in FIG. 9 after a step of fitting a wall reinforcement, which illustrates a third operating method of the invention.
Figure 15:
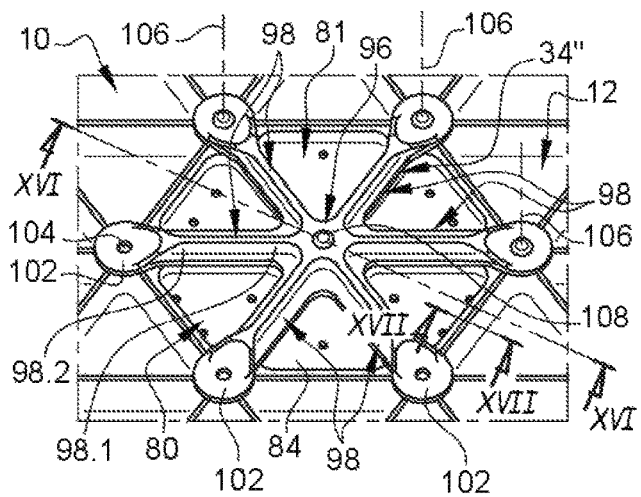
FIG. 15 is a perspective view of the part of the panel that can be seen in FIG. 14 after a step of fitting a structural reinforcement, which illustrates the third operating method of the invention.

According to another embodiment, the wall reinforcement 60 comprises first and second reinforcement plates 64, 64' arranged on either side of the wall 12, a first reinforcement plate 64 pressed against the base 58 of the large cell 54 and a second reinforcement plate 64' pressed against the first face 10.1 of the stiffened panel 10, the first and second reinforcement plates 64, 64' being connected to the wall 12 by the link elements 62. The first reinforcement plate 64 is configured such as to cover practically all the base 58 of the large cell 54. In parallel, the second reinforcement plate 64' extends beyond the large cell 54, as illustrated in FIGS. 10, 11 and 13. The first and second reinforcement plates 64, 64' have a hexagonal contour with rounded corners.

According to another embodiment that can be seen in FIG. 11, the wall reinforcement 60 comprises a third reinforcement plate 64'', intercalated between the first and second reinforcement plates 64, 64', positioned in the region of the orifice 56 of the wall 12. This third reinforcement plate 64'' has a thickness substantially equal to that of the wall 12 and a cross section substantially identical to that of the orifice 56.

The reinforcement plate(s) 64, 64', 64'' may be connected to the wall 12 by the fitting of fasteners, adhesive bonding, welding or the like.

The repair method comprises a step of fitting a structural reinforcement 34' connected to all the peripheral nodes 16 positioned about the large cell 54 and also to the wall reinforcement(s) 60.

According to one embodiment, the structural reinforcement 34' comprises a plate 66 comprising a first face 66.1 configured such as to be pressed against the wall reinforcement 60 and a second face 66.2 opposite the first face, a node 68 projecting and centered relative to a second face 66.2 of the plate 66, a plurality of ribs 70 projecting relative to the second face 66.2 of the plate 66 and regularly distributed about the node 68. Each rib 70 comprises a first end 70.1 connected to the node 68 and a second end 70.2 having a head 72 connected to one of the peripheral nodes 16. According to one configuration, each head 72 has the form of a plate configured such as to be pressed against the terminal face 22 of one of the peripheral nodes 16 and to have a passage hole 74.

The plate 66, the node 68, the ribs 70 and the heads 72 are produced as a single piece or by the assembly of components.

The structural reinforcement 34' is connected to each of the peripheral nodes 16 by virtue of link elements 76 such as, for example screws that traverse the passage holes 74 and screw into the anchoring points 32' of the peripheral nodes 16. The structural reinforcement 34' is also connected to the wall reinforcement 60 by link elements 78 connecting the plate 66 of the structural reinforcement 34' and the wall reinforcement 60. In a variant, the structural reinforcement 34' might be connected to the peripheral nodes 16 and/or to the wall reinforcement 60 by adhesive bonding, by welding or the like.

According to a third operating method, illustrated in FIGS. 14 to 18, the repair method comprises a step of removal of material and, optionally, a step of production of the anchoring points 32'. These steps may be identical to those of the second operating method.

The repair method comprises a step of fitting at least one wall reinforcement 80 connected at least to the wall 12 by link elements 82.

According to one embodiment, the wall reinforcement 80 comprises a structure 81 of isogrid type comprising a hexagonal wall 84 having a contour approximately equal to that of the large cell 54 and a first face 84.1 configured such as to be pressed against the base 58 of the large cell 54, a central node 86 positioned on the second face 84.2 of the wall 84 and also a network of radial and peripheral ribs 88, 90 positioned on the second face 84.2 delimiting six triangular cells 92 about the central node 86.

The structure 81 of isogrid type comprises a first face 81.1 corresponding to the first face 84.1 of the hexagonal wall 84 and a second face 81.2 formed by the terminal face of the central node 86 and the edges of the radial and peripheral ribs 88, 90.

The central node 86 comprises an anchoring point 93.

The hexagonal wall 84, the central node 86 and the network of radial and peripheral ribs 88, 90 are produced as a single piece or by the assembly of components. They are configured such that, when the structure 81 of isogrid type is inserted into the large cell 54 and the hexagonal wall 84 is pressed against the base 58 of the large cell 54, the peripheral ribs 90 of the structure 81 of isogrid type are in contact with or closely spaced relative to the ribs 14 positioned at the periphery of the large cell 54 and such that the second face 81.2 of the structure 81 of isogrid type is coplanar relative to the second face 10.2 of the stiffened panel 10, as illustrated in FIG. 17.

The wall reinforcement 80 is connected to the stiffened panel 10 by the link elements 82 positioned in the region of the hexagonal wall 84 and/or of the peripheral ribs 90, as illustrated in FIGS. 17 and 18. In a variant, the wall reinforcement 80 might be connected to the wall 12 and/or to the ribs located at the periphery of the large cell 54 by adhesive bonding, by welding or the like.

The wall reinforcement 80 comprises a reinforcement plate 94 positioned in the region of the orifice 56 of the wall 12, having a thickness substantially equal to that of the wall 12 and a cross section substantially identical to that of the orifice 56. This reinforcement plate 94 is connected to the structure 81 of isogrid type by any appropriate means, such as by screwing, riveting or the like.

The repair method comprises a step of fitting a structural reinforcement 34″ connected to all the peripheral nodes 16 positioned about the large cell 54 and also to the reinforcement wall 80.

According to one embodiment, the structural reinforcement 34″ comprises a central body 96 configured such as to be pressed on and connected to the central node 86 and also six branches 98 regularly distributed about the central body 96. The central body 96 has a passage hole 100.

Each branch 98 has a first end 98.1 connected to the central body 96 and a second end 98.2 having a head 102 connected to one of the peripheral nodes 16. According to one configuration, each head 102 has the form of a plate configured such as to be pressed against the terminal face 22 of one of the peripheral nodes 16 and to have a passage hole 104.

The central body 96, the branches 98 and the heads 102 are made as a single piece.

The structural reinforcement 34″ is connected to the peripheral nodes 16 positioned about the large cell 54 by link elements 106, for example screws traversing the passage holes 104 and screwed into the anchoring points 32′ of the peripheral nodes 16. The structural reinforcement 34″ is connected to the wall reinforcement 80 by a link element 108, for example a screw traversing the passage hole 100 and screwed into the anchoring point 93 of the central node 86 of the wall reinforcement 80. In a variant, the structural reinforcement 34″ might be connected to the wall reinforcement 80 and/or to the peripheral nodes by adhesive bonding, by welding or the like.

Irrespective of the operating method, the repair method comprises a step of removal of material and also steps of fitting at least one structural reinforcement 34, 34′, 34″, connecting at least two nodes positioned about the damaged zone, and at least one wall reinforcement 42.1, 42.2, 60, 80 connecting the wall 12 of the stiffened panel 10 and the structural reinforcement 34, 34′, 34″. The step of removal of material comprises removing at least a part of damaged rib in such a manner as to obtain a recess formed, as a minimum, by two cells. Generally, all the damaged ribs are removed and the recess has a symmetrical form such as, for example, the form of a large cell 54 corresponding to six cells of the stiffened panel.

At the end of the repair method, the repaired stiffened panel 10 comprises at least one structural reinforcement 34, 34′, 34″ connected to at least two nodes positioned about the damaged zone and at least one wall reinforcement 42.1, 42.2, 60, 80 connecting the wall 12 of the stiffened panel 10 and the structural reinforcement 34, 34′, 34″.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for repair of a stiffened isogrid panel, comprising a wall, a network of ribs and nodes arranged in such a manner as to form cells, each cell having a triangular contour, said stiffened isogrid panel having at least one damaged zone, wherein the repair method comprises:
removing material to remove at least one damaged rib from the damaged zone,
fitting at least one structural reinforcement,
connecting at least two nodes positioned around the damaged zone, and of at least one wall reinforcement connecting the wall of the stiffened isogrid panel and the structural reinforcement.

2. The repair method according to claim 1, wherein the step of removal of material comprises removing all the damaged ribs from the damaged zone.

3. The repair method according to claim 2, wherein the removal of material forms a large cell corresponding to six adjacent cells of the stiffened isogrid panel, and wherein the step of removal of material comprises making an orifice in the wall.

4. The repair method according to claim 1, wherein the structural reinforcement is fitted and connected to the nodes surrounding the damaged zone, then each wall reinforcement is fitted and connected to the wall and also to the structural reinforcement.

5. The repair method according to claim 1, wherein the wall reinforcement is fitted and connected at least to the wall, then the structural reinforcement is fitted and connected to the nodes surrounding the damaged zone and to the wall reinforcement.

* * * * *